(12) United States Patent
Lebby et al.

(10) Patent No.: US 7,643,526 B1
(45) Date of Patent: Jan. 5, 2010

(54) SPONTANEOUS/STIMULATED LIGHT EMITTING μ-CAVITY DEVICE

(76) Inventors: Michael Lebby, 30 N. La Barge Rd., Apache Junction, AZ (US) 85219; Vijit Sabnis, 2250 Homestead Ct., Apt. 206, Los Altos, CA (US) 94024; Petar B. Atanackovic, 1050 Waverley St., Palo Alto, CA (US) 94301

( * ) Notice: Subject to any disclaimer, the term of this patent is extended or adjusted under 35 U.S.C. 154(b) by 398 days.

(21) Appl. No.: 11/472,087

(22) Filed: Jun. 21, 2006

(51) Int. Cl.
*H01S 3/16* (2006.01)
(52) U.S. Cl. .................................. 372/41; 372/40
(58) Field of Classification Search .............. 372/40, 372/41
See application file for complete search history.

(56) References Cited

U.S. PATENT DOCUMENTS 6,734,453 B2 * 5/2004 Atanackovic et al. ......... 257/19
6,846,509 B2 * 1/2005 Chen et al. .................... 427/66

FOREIGN PATENT DOCUMENTS

WO   WO9200610 A1 * 1/1992

OTHER PUBLICATIONS

Zhu et al., "Epitaxial growth of Er2O3 films on oxidized Si(111) and Si(001) substrates", Nov. 9, 2005, ELSEVIER, Thin solid films, 508, 86-89.*

* cited by examiner

*Primary Examiner*—Minsun Harvey
*Assistant Examiner*—Joshua King
(74) *Attorney, Agent, or Firm*—Parsons & Goltry; Robert A. Parsons; Michael W. Goltry

(57) ABSTRACT

A light emitting device with a μ-cavity including a first spacer of single crystal dielectric material and an active area including single crystal erbium dielectric material positioned on the first spacer. The erbium dielectric material and the single crystal dielectric material of the first spacer are substantially crystal lattice matched at their juncture. A second spacer of single crystal dielectric material is positioned on the active area. The erbium dielectric material and the single crystal dielectric material of the second spacer are substantially crystal lattice matched at the second surface. The high-κ erbium dielectric provides a high gain κ-cavity that emits increased amounts of light in either spontaneous or stimulated modes of operation.

13 Claims, 4 Drawing Sheets

SPONTANEOUS/STIMULATED LIGHT EMITTING μ-CAVITY DEVICE

FIELD OF THE INVENTION

This invention relates in general to light emitting devices, and more particularly to devices capable of producing light spontaneously or through stimulation or enhancement.

BACKGROUND OF THE INVENTION

Light emitting diodes are well known in the semiconductor art and generally consist of two layers or more that spontaneously emit light when electric current is applied therethrough. Generally, the color or wavelength of the light emitted is dependent upon the materials used to form the light emitting diode.

Devices commonly referred to as semiconductor lasers have also become well known and popular in recent years. The best known of this group are vertical cavity surface emitting lasers (VCSEL) and edge emitting lasers. Semiconductor lasers generally produce light in response to some stimulation, such as light pumping or electrical pumping. The pumping action is necessary to initiate light emission by the active region and amplification by the mirror stacks. Reflection of the generated light by the mirror stacks further pumps or stimulates the active region so that a lasing action occurs. Generally, the color or wavelength of the light emitted by a semiconductor laser is dependent upon the resonance of the u-cavity and the material used in the active region.

For purposes of differentiation, spontaneous light emission is defined as light generated by simply supplying activating electrical current to a semiconductor junction or active area while stimulated emission occurs when emitted light is enhanced or amplified in a μ-cavity and supporting mirror stacks. It will be understood that spontaneous emission is generally much less (i.e. brightness or photoluminescence) than stimulated emission. Because of the difference in the power of emission, spontaneous emitting diodes and the like do not produce sufficient light for communicating at high data rates through optical fibers and in other communication systems.

It would be highly advantageous, therefore, to remedy the foregoing and other deficiencies inherent in the prior art.

Accordingly, it is an object of the present invention to provide a new and improved μ-cavity device capable of relatively high spontaneous or stimulated light emission.

Another object of the invention is to provide a new and improved μ-cavity device capable of sufficient spontaneous light emission for use in communication systems and the like.

Another object of the invention is to provide a new and improved μ-cavity device in which the wavelength of emitted light can be shifted by mirror stacks.

SUMMARY OF THE INVENTION

Briefly, to achieve the desired objects of the instant invention in accordance with a preferred embodiment thereof, provided is a light emitting device with a μ-cavity including a first spacer, an active region, and a second spacer sandwiched together. The first spacer is formed of single crystal dielectric material and the active area includes single crystal erbium dielectric material positioned on the first spacer. The erbium dielectric material and the single crystal dielectric material of the first spacer are substantially crystal lattice matched at their juncture. A second spacer of single crystal dielectric material is positioned on the active area. The erbium dielectric material and the single crystal dielectric material of the second spacer are substantially crystal lattice matched at their juncture. The high-κ erbium dielectric provides a high gain μ-cavity that emits increased amounts of light in either spontaneous or stimulated modes of operation.

In a preferred embodiment, the first and second spacers include silicon dielectric material, such as silicon dioxide, silicon nitride, or silicon oxy-nitride. The active region includes erbium dielectric material, such as erbium dioxide, erbium nitride, or erbium oxy-nitride. The light emitting device further includes a distributed Bragg reflector (DBR) positioned on a supporting substrate with the first spacer positioned on the DBR. If further enhanced emission is desired, a second DBR is positioned on the second spacer. A selected wavelength of the light emission from the device can be different than the normal wavelength of the active region, and the thicknesses of at least the active region and the second spacer can be designed to shift the light emission from the normal wavelength to the selected wavelength.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
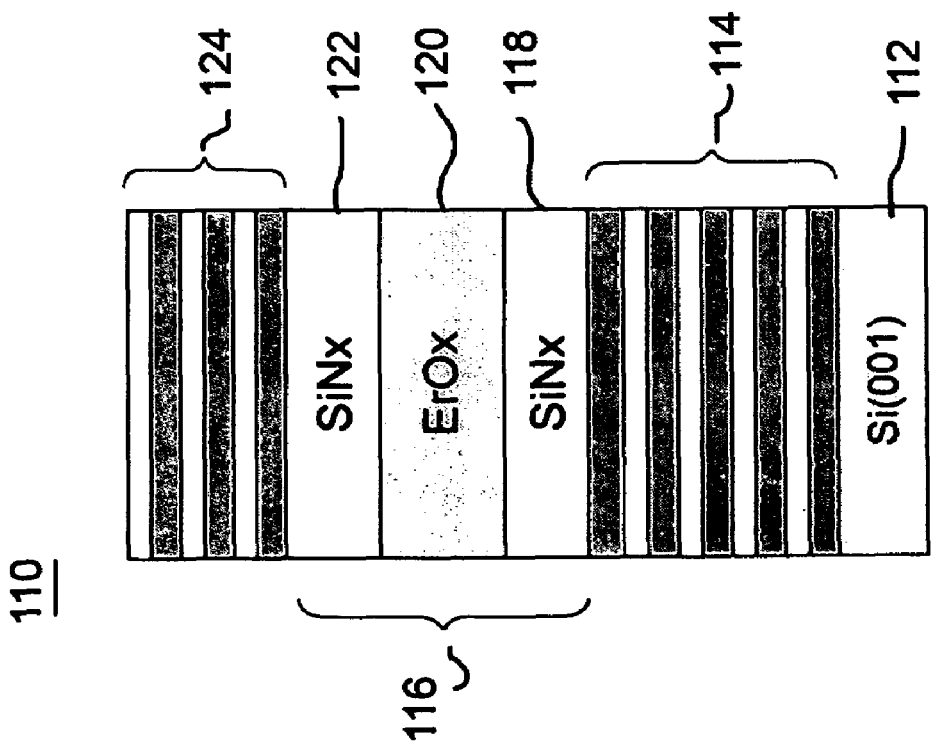
FIG. 1 is a simplified sectional view of one embodiment of a μ-cavity device in accordance with the present invention.

Turning now to FIG. 1, a simplified sectional view of one embodiment of a μ-cavity device 10 in accordance with the present invention is illustrated. In this disclosure, for convenience, device 10 is illustrated and described as physically similar to a VCSEL. It will be understood, however, from the description below that device 10 may not, in fact, be a laser with stimulated emission but may be a light emitting diode with spontaneous emission.

Device 10 is formed on a layer 12 of single crystal silicon with a (001) upper facet. It will be understood that layer 12 can be a semiconductor wafer, portion of a wafer, chip, etc., or a layer formed on some convenient supporting material. Further, for purposes of this disclosure, layer 12 will simply be referred to as supporting substrate 12.

A first distributed Bragg reflection (DBR) or mirror stack 14 is deposited on supporting substrate 12 by any means, such as epitaxial deposition or the like. In this embodiment, for purposes of explanation only, mirror stack 14 includes 8 mirror pairs or two-layer combinations of materials selected to provide the desired reflectivity. Mirror stack 14 preferably includes materials that are relatively simple to deposit, such as silicon/silicon dioxide ($Si/SiO_2$) or silicon/RE Oxide, and may be p-doped to provide the required conductivity for an electrically activated diode. It will of course be understood that, while mirror stack 14 is described as a semiconductor stack, it could be any of the distributed Bragg reflectors (DBRs) well known in the industry. Typically, DBRs or mirror stacks are formed of a material system generally consisting of two materials having different indices of refraction and being easily lattice matched to the other portions of the device, however, other DBRs (dielectric stacks, etc.) can be provided using other techniques, e.g., wafer bonding or the like.

A µ-cavity 16 is provided on the upper surface of mirror stack 14 and includes a lower spacer 18, an active region 20, and an upper spacer 22. In this embodiment, lower spacer 18 is formed approximately 1000 Å thick of single crystal silicon nitride (SiNx). Active region 20 is formed approximately 1500 Å thick of Erbium (Er) oxide (ErOx). Upper spacer 22 is formed approximately 1320.9 Å thick of single crystal silicon nitride (SiNx). As is known in the art, lower spacer 18, active region 20, and upper spacer 22 are approximately lattice matched and generally grown epitaxially in a continuous sequence. For purposes of this disclosure, µ-cavity 16 is formed with a resonance at 1578 nm.

Because active region 20 is formed of high-κ dielectric material, ErOx, the gain of the active region is substantially greater than active regions of other light emitting devices and, consequently, the emission is much greater. Also, ErOx can be grown as a single crystal layer on the silicon nitride (SiNx) using standard semiconductor techniques, e.g. epitaxial growth, and is substantially crystal lattice method. Thus, some form of silicon dielectric, e.g. silicon nitride, silicon oxide, silicon oxy-nitride, etc., is preferred as the spacer layer of layers. Also, while erbium oxide is used in the preferred embodiment, it is anticipated that other forms of erbium dielectric, e.g. erbium oxide, erbium nitride, erbium oxy-nitride, etc., can be incorporated if desired. Different combinations of silicon dielectric and erbium dielectric can be devised while still maintaining substantially a crystal lattice match between adjacent layers. As is understood in the art, a small crystal mismatch or substantially crystal lattice match at the junction of the adjacent layers produces a strain, which preferably lies in a range between zero and an acceptable strain. In the various structures described, the strain is in a range between 0.1% and 0.4% but an acceptable strain can be in a 1% or 2% range and can be as high as 5%.

A second or upper distributed Bragg reflector (DBR) or mirror stack 24 is provided on the upper surface of upper spacer 22 by any means, such as epitaxial deposition or the like. In this embodiment, for purposes of explanation only, mirror stack 24 includes 5 mirror pairs or two-layer combinations of materials selected to provide the desired reflectivity. Mirror stack 24 preferably includes materials that are relatively simple to deposit, such as silicon/silicon dioxide (Si/SiO$_2$) or silicon/RE Oxide, and may be n-doped to provide the required conductivity for an electrically activated diode. It will of course be understood that, while mirror stack 24 is described as a semiconductor stack, it could be any of the distributed Bragg reflectors (DBRs) well known in the industry. Typically, DBRs or mirror stacks are formed of a material system generally consisting of two materials having different indices of refraction and being easily lattice matched to the other portions of the device, however, other DBRs (dielectric stacks, etc.) can be provided using other techniques, e.g., wafer bonding or the like.

Figure 2:
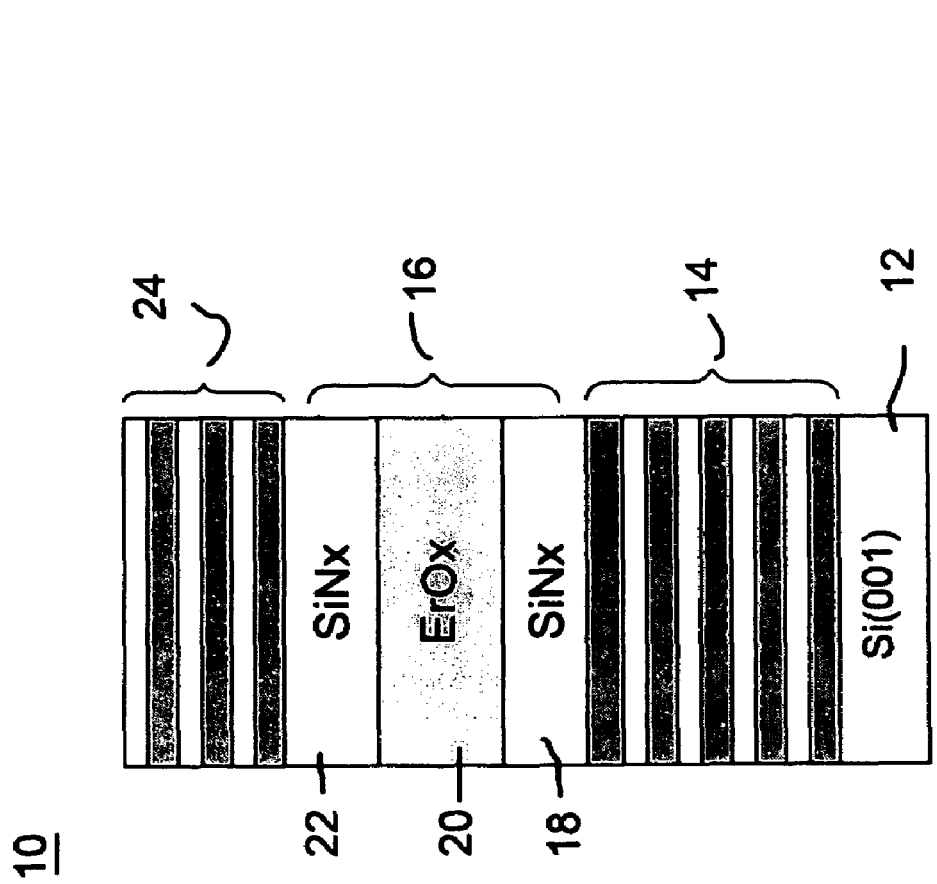
FIG. 2 is a simplified sectional view of another embodiment of a μ-cavity device in accordance with the present invention.

Turning now to FIG. 2, a simplified sectional view of another embodiment of a µ-cavity device 110 in accordance with the present invention is illustrated. In this disclosure, for convenience, device 110 is illustrated and described as physically similar to device 10 of FIG. 1. Device 110 is formed on a layer 112 of single crystal silicon with a (001) upper facet.

It will be understood that layer 112 can be a semiconductor wafer, portion of a wafer, chip, etc., or a layer formed on some convenient supporting material. Further, for purposes of this disclosure, layer 112 will simply be referred to as supporting substrate 112.

A first distributed Bragg reflector (DBR) or mirror stack 114 is deposited on supporting substrate 112 by any means, such as epitaxial deposition or the like. In this embodiment, for purposes of explanation only, mirror stack 114 includes 8 mirror pairs or two-layer combinations of materials selected to provide the desired reflectivity. As described above, mirror stack 114 preferably includes materials that are relatively simple to deposit, such as silicon/silicon dioxide (Si/SiO$_2$) or silicon/RE Oxide, and may be p-doped to provide the required conductivity for an electrically activated diode. It will of course be understood that, while mirror stack 114 is described as a semiconductor stack, it could be any of the distributed Bragg reflectors (DBRs) well known in the industry.

A µ-cavity 116 is provided on the upper surface of mirror stack 114 and includes a lower spacer 118, an active region 120, and an upper spacer 122. In this embodiment, lower spacer 118 is formed 1000 Å thick of single crystal silicon nitride (SiNx). Active region 120 is formed 2250 Å thick of Erbium (Er) oxide (ErOx). Upper spacer 122 is formed approximately 570.9 Å thick of single crystal silicon nitride (SiNx). As described above, lower spacer 118, active region 120, and upper spacer 122 are approximately lattice matched and generally grown epitaxially in a continuous sequence. For purposes of this disclosure, µ-cavity 116 is formed with a resonance at 1578 nm.

A second or upper distributed Bragg reflector (DBR) or mirror stack 124 is provided on the upper surface of upper spacer 122 by any means, such as epitaxial deposition or the like. In this embodiment, for purposes of explanation only, mirror stack 124 includes 5 mirror pairs or two-layer combinations of materials selected to provide the desired reflectivity. Mirror stack 124 preferably includes materials that are relatively simple to deposit, such as silicon/silicon dioxide (Si/SiO$_2$) or silicon/RE Oxide, and may be n-doped to provide the required conductivity for an electrically activated diode. It will of course be understood that, while mirror stack 24 is described as a semiconductor stack, it could be any of the distributed Bragg reflectors (DBRs) well known in the industry.

Figure 3:
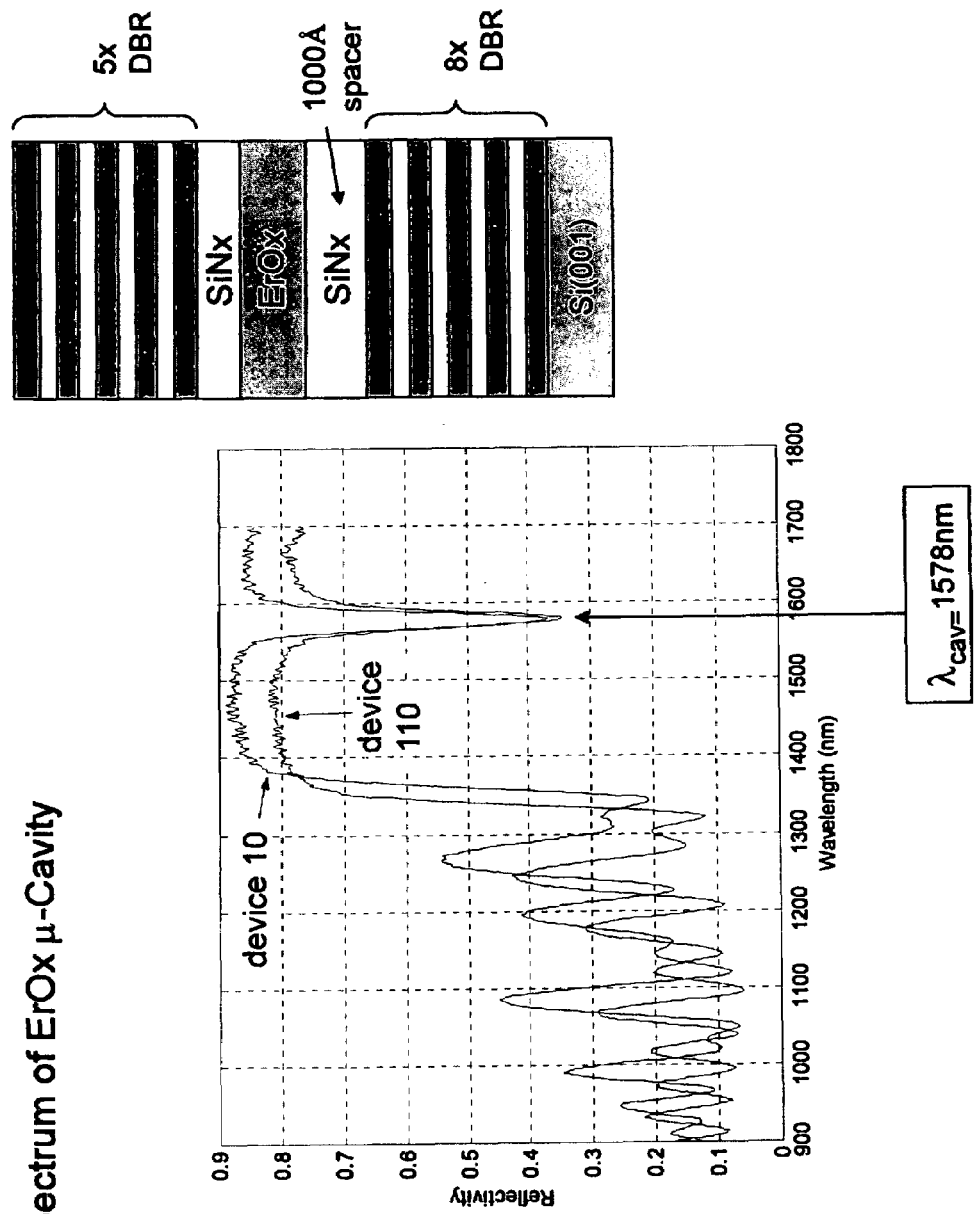
FIG. 3 illustrates the reflectivity spectrum of the μ-cavity devices of FIGS. 1 and 2.
Figure 4:
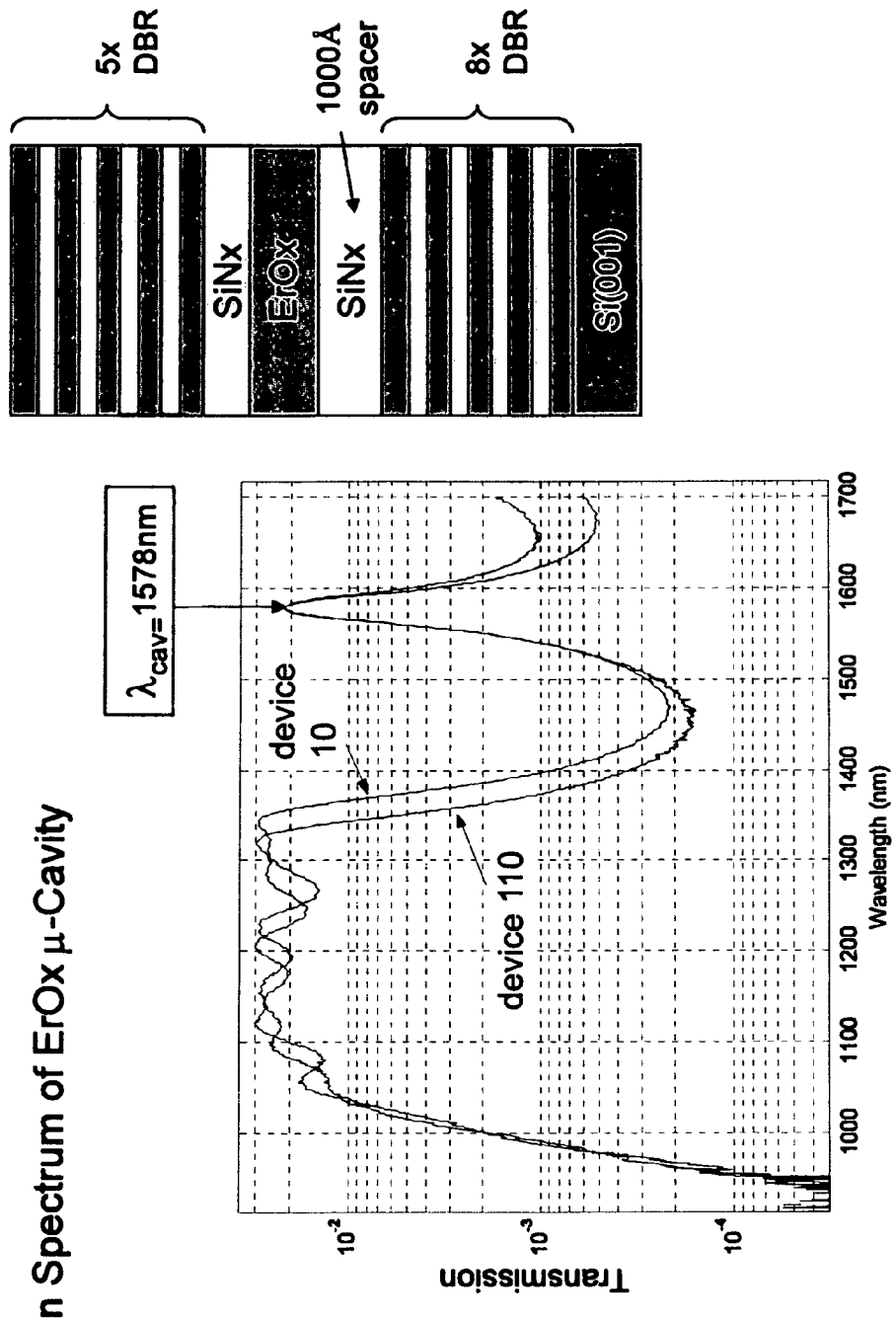
FIG. 4 illustrates the transmission spectrum of the μ-cavity devices of FIGS. 1 and 2.
Figure 5:
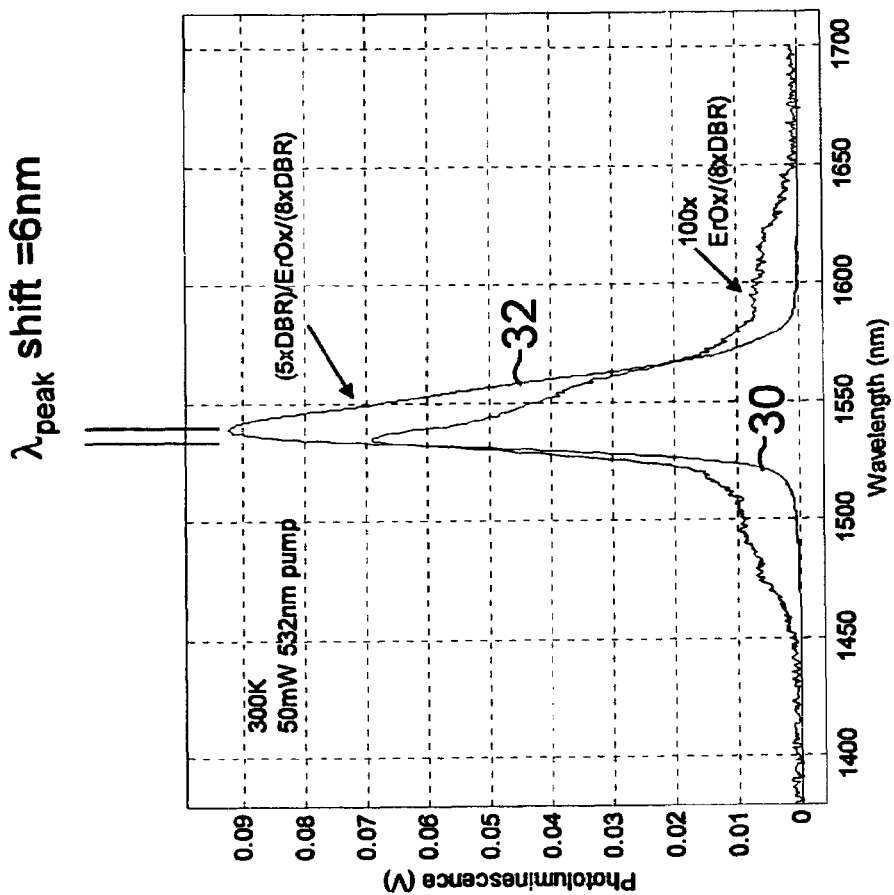
FIG. 5 illustrates the light emission of a μ-cavity device, in accordance with the present invention, with and without a top mirror stack.

Referring additionally to FIGS. 3 and 4, it can be seen that devices have somewhat different reflectivity spectrums and transmission spectrums, respectively. However, both devices 10 and 110 show a definite resonance at 1578 nm. One purpose of forming devices with different upper spacer layer and active region thicknesses was to achieve a resonance at 1536 nm. During this process, two important features were discovered. First, as illustrated in FIG. 5, the novel active region of ErOx formed in a µ-cavity (e.g. µ-cavity 16 or 116), produced spontaneous emission that is enhanced 100× over normal spontaneous emission devices, e.g. LEDs and the like. The fact that the emission is spontaneous is confirmed by the omission of an upper mirror stack (e.g. DBR 24 or 124, respectively). This emission is illustrated graphically by waveform 30 in FIG. 5.

Second, as illustrated in FIG. 5, the peak waveform, designated 32, of the novel active region of ErOx formed in a µ-cavity (e.g. µ-cavity 16 or 116), was not only substantially increased but was shifted to the right 6 nm by the addition of an upper mirror stack (e.g. DBR 24 or 124, respectively). Thus, while the emission is still spontaneous, the peak wavelength of the emission can be increased and shifted in wavelength by the addition of an upper DBR. As will be understood by those skilled in the laser art, spacers adjacent the active region are generally formed approximately one-half wavelength at the operating frequency or wavelength of the active region so that reflected emission supports and enhances lasing in the active region. However, in the present structure, by adjusting thicknesses of the active region and the spacer layer or layers, the peak wavelength of the emission is shifted away from a normal emission wavelength of the active region to a resonance point of the μ-cavity and the emission is stimulated so the device lases or becomes a laser.

Thus, a new and improved μ-cavity device is disclosed that can emit substantially increased light either spontaneously or stimulated. Also, the wavelength of emitted light from the new and improved μ-cavity device can be shifted from a normal emission wavelength of the active region, if desired, to produce a selected emission wavelength.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A light emitting device including a μ-cavity, the μ-cavity comprising:
    a first spacer of single crystal dielectric material with a first surface;
    an active area including single crystal erbium dielectric material positioned on the first surface of the first spacer, the erbium dielectric material and the single crystal dielectric material of the first spacer being substantially crystal lattice matched at the first surface; and
    a second spacer of single crystal dielectric material with a second surface, the second spacer being positioned on the active area, and the erbium dielectric material and the single crystal dielectric material of the second spacer being substantially crystal lattice matched at the second surface.

2. A light emitting device including a μ-cavity as claimed in claim 1 wherein the single crystal erbium dielectric material includes one of erbium oxide, erbium nitride, and erbium oxy-nitride.

3. A light emitting device including a μ-cavity as claimed in claim 2 wherein the single crystal erbium dielectric material includes erbium oxide.

4. A light emitting device including a μ-cavity as claimed in claim 1 wherein the single crystal dielectric material of the first spacer includes a silicon dielectric material.

5. A light emitting device including a μ-cavity as claimed in claim 4 wherein the single crystal silicon dielectric material includes one of silicon oxide, silicon nitride, and silicon oxy-nitride.

6. A light emitting device includes a μ-cavity as claimed in claim 1 wherein the single crystal dielectric material of the second spacer includes a silicon dielectric material.

7. A light emitting device including a μ-cavity as claimed in claim 6 wherein the single crystal silicon dielectric material includes one of silicon oxide, silicon nitride, and silicon oxy-nitride.

8. A light emitting device including a μ-cavity, the μ-cavity comprising:
    a first spacer of single crystal silicon dielectric material with a first surface;
    an active area including single crystal erbium dielectric material positioned on the first surface of the first spacer, the erbium dielectric material and the single crystal silicon dielectric material of the first spacer being substantially crystal lattice matched at the first surface; and
    a second spacer of single crystal silicon dielectric material with a second surface, the second spacer being positioned on the active area, and the erbium dielectric material and the single crystal silicon dielectric material of the second spacer being substantially crystal lattice matched at the second surface.

9. A light emitting device for providing light emission at a selected wavelength comprising:
    a first distributed Bragg reflector positioned on a supporting substrate;
    a first spacer of single crystal silicon dielectric material positioned on the first distributed Bragg reflector, the first spacer having a first surface;
    an active area including single crystal erbium dielectric material positioned on the first surface of the first spacer, the erbium dielectric material and the single crystal silicon dielectric material of the first spacer being substantially crystal lattice matched at the first surface, the active area being formed to emit light at a normal wavelength for the single crystal erbium dielectric material; and
    a second spacer of single crystal silicon dielectric material with a second surface, the second spacer being positioned on the active area, and the erbium dielectric material and the single crystal silicon dielectric material of the second spacer being substantially crystal lattice matched at the second surface.

10. A light emitting device as claimed in claim 9 wherein the light emission at a selected wavelength from the device is spontaneous emission.

11. A light emitting device as claimed in claim 9 further including a second distributed Bragg reflector positioned on the second spacer.

12. A light emitting device as claimed in claim 11 wherein the selected wavelength of the light emission from the device is different than the normal wavelength of the active region, and at least the active region and the second spacer have thicknesses designed to shift the light emission from the normal wavelength to the selected wavelength.

13. A light emitting device as claimed in claim 11 wherein the light emission at a selected wavelength from the device is spontaneous emission.

* * * * *